(12) United States Patent
Kim et al.

(10) Patent No.: US 9,543,584 B2
(45) Date of Patent: Jan. 10, 2017

(54) BINDER FOR SECONDARY BATTERY PROVIDING EXCELLENT CYCLE PROPERTY

(75) Inventors: Ok Sun Kim, Daejeon (KR); Young-Min Kim, Daejeon (KR); MinAh Kang, Daejeon (KR)

(73) Assignee: LG Chem, Ltd. (KR)

( * ) Notice: Subject to any disclaimer, the term of this patent is extended or adjusted under 35 U.S.C. 154(b) by 479 days.

(21) Appl. No.: 13/704,013

(22) PCT Filed: Jun. 8, 2011

(86) PCT No.: PCT/KR2011/004180
§ 371 (c)(1),
(2), (4) Date: Feb. 6, 2013

(87) PCT Pub. No.: WO2011/159057
PCT Pub. Date: Dec. 22, 2011

(65) Prior Publication Data
US 2013/0202963 A1    Aug. 8, 2013

(30) Foreign Application Priority Data
Jun. 16, 2010    (KR) .................. 10-2010-0057146

(51) Int. Cl.
| | |
|---|---|
| H01M 4/62 | (2006.01) |
| C08F 212/12 | (2006.01) |
| C08F 212/32 | (2006.01) |
| C08F 212/36 | (2006.01) |
| C08F 220/18 | (2006.01) |
| H01M 10/0525 | (2010.01) |
| C08F 212/08 | (2006.01) |
| C08F 220/06 | (2006.01) |
| C08F 220/40 | (2006.01) |
| H01M 4/131 | (2010.01) |
| H01M 4/133 | (2010.01) |
| H01M 4/134 | (2010.01) |
| H01M 10/0567 | (2010.01) |
| H01M 10/0569 | (2010.01) |
| C08F 220/44 | (2006.01) |

(52) U.S. Cl.
CPC ............ *H01M 4/622* (2013.01); *C08F 212/12* (2013.01); *C08F 212/32* (2013.01); *C08F 212/36* (2013.01); *C08F 220/18* (2013.01); *H01M 4/621* (2013.01); *H01M 10/0525* (2013.01); *C08F 212/08* (2013.01); *C08F 220/06* (2013.01); *C08F 220/40* (2013.01); *C08F 220/44* (2013.01); *C08F 2220/1858* (2013.01); *H01M 4/131* (2013.01); *H01M 4/133* (2013.01); *H01M 4/134* (2013.01); *H01M 4/624* (2013.01); *H01M 10/0567* (2013.01); *H01M 10/0569* (2013.01); *Y02E 60/122* (2013.01)

(58) Field of Classification Search
CPC .......................... C08F 212/06; C08F 220/18
See application file for complete search history.

(56) References Cited

U.S. PATENT DOCUMENTS

| | | | | |
|---|---|---|---|---|
| 6,656,633 | B2 * | 12/2003 | Yamakawa et al. | 429/217 |
| 6,756,153 | B1 | 6/2004 | Yamamoto et al. | |
| 8,277,976 | B2 * | 10/2012 | Ryu et al. | 429/217 |
| 2006/0275661 | A1 * | 12/2006 | Kim et al. | 429/217 |
| 2010/0047690 | A1 * | 2/2010 | Tsuchiya | H01M 4/621 |
| | | | | 429/217 |

FOREIGN PATENT DOCUMENTS

| | | |
|---|---|---|
| CN | 102725890 A | 10/2012 |
| JP | 2000286167 A | 10/2000 |
| KR | 20010099909 A | 11/2001 |
| KR | 20030010406 A | 2/2003 |
| KR | 20060119797 A | 11/2006 |
| KR | 100711975 B1 | 5/2007 |
| KR | 100729118 B1 | 6/2007 |
| WO | 03/012896 A1 | 2/2003 |

OTHER PUBLICATIONS

Machine translation of JP 2000-286167 A, ProQuest Dialog, retrieved Mar. 2015.*
International Search Report for Application No. PCT/KR2011/004180 dated Feb. 27, 2012.

* cited by examiner

*Primary Examiner* — Nicole M Buie-Hatcher
(74) *Attorney, Agent, or Firm* — Lerner, David, Littenberg, Krumholz & Mentlik, LLP

(57) ABSTRACT

Provided is a binder for secondary battery electrodes wherein the content of a gel comprising a polymer particle obtained by copolymerizing three or more types of monomers is 50 to 100% by weight and a swelling index of the binder to an electrolyte is 1.1 to 5.0. The binder fundamentally improves electrode stability due to the gel content defined above and increases ionic conductivity due to the swelling index, thus providing secondary batteries with superior cycle properties.

11 Claims, No Drawings

BINDER FOR SECONDARY BATTERY PROVIDING EXCELLENT CYCLE PROPERTY

CROSS REFERENCE TO RELATED APPLICATIONS

The present application is a national phase entry under 35 U.S.C. §371 of International Application No. PCT/KR2011/004180, filed Jun. 8, 2011, published in English, which claims priority from Korean Patent Application No. 10-2010-0057146, filed Jun. 16, 2010. The disclosures of said applications are incorporated by reference herein.

TECHNICAL FIELD

The present invention relates to a binder for secondary battery electrodes. More specifically, the present invention relates to a binder for secondary battery electrodes wherein the content of a gel comprising a polymer particle obtained by copolymerizing three or more types of monomers is 50 to 100% and a swelling index of the binder to an electrolyte is 1.1 to 5.0.

BACKGROUND ART

Rapidly increasing use of fossil fuels has led to an increase in demand for use of alternative or clean energy. In light of such trends, generation and storage of electricity using electrochemical reaction are a very active area of research.

In recent years, representative examples of electrochemical devices using electrochemical energy are secondary batteries, and application thereof continues to expand.

Recently, technological development and increased demand associated with portable equipment such as portable computers, cellular phones and cameras have brought about an increase in the demand for secondary batteries as energy sources. Among these secondary batteries, lithium secondary batteries having high energy density and voltage, long lifespan and low self-discharge have been actively researched and are commercially available and widely used.

In addition, increased interest in environmental issues has brought about a great deal of research associated with electric vehicles, hybrid electric vehicles or the like as alternatives to vehicles using fossil fuels such as gasoline vehicles and diesel vehicles. These electric vehicles and hybrid electric vehicles generally use nickel-metal hydride secondary batteries as power sources. However, a great deal of study associated with lithium secondary batteries with high energy density and discharge voltage is currently underway and some are commercially available.

Conventional typical lithium secondary batteries use graphite as an anode active material. Lithium ions of a cathode are repeatedly intercalated into and de-intercalated from the anode to realize charge and discharge. The theoretical capacity of a battery varies depending upon the type of the electrode active material. Deterioration in charge and discharge capacity of a battery generally occurs in the course of the cycle life of the battery.

The primary reason behind such phenomenon is that separation between an electrode active material, or separation between the electrode active material and a collector due to volume variation in the electrode as batteries in the course of charging and discharging results in insufficient realization of function of the active material. In addition, in the process of intercalation and de-intercalation, lithium ions intercalated into the anode cannot be sufficiently de-intercalated and active sites of the anode are thus decreased. For this reason, charge/discharge capacity and lifespan of batteries may decrease as the batteries are cycled.

In particular, in order to improve discharge capacity, in the case where natural graphite having a theoretical discharge capacity of 372 mAh/g is used in combination with a material such as silicon, tin or silicon-tin alloys having high discharge capacity, volume expansion of the material considerably increases, in the course of charging and discharging, thus causing isolation of the anode material from the electrode material. As a result, battery capacity disadvantageously rapidly decreases over repeated cycles.

Accordingly, there is an increasing demand in the art for binder and electrode materials which can prevent separation between the electrode active material, or between the electrode active material and the collector upon fabrication of electrodes via strong adhesion and can control volume expansion of the electrode active material upon repeated charge/discharge via strong physical properties, thus improving battery performance.

Polyvinylidene difluoride (PVdF), which is generally used as a binder of cathodes and anodes, is a polymer resin dissolved in an organic solvent such as N-methyl-2-pyrrolidone (NMP). Although PVdF was not developed as an adhesive, it is generally used as a binder of electrode active materials, since it exhibits superior miscibility with a graphite material and realizes formation of an electrode plate with superior adhesion strength when added in about an amount of 8 to 10% of the graphite.

However, since PVdF covers an active material in a state in which polymer fibers are packed, the electrode active material deteriorates inherent battery performance in terms of capacity and efficiency. In addition, in the case where a material having a large specific surface area like natural graphite or metallic active materials and exhibiting high expansion and contraction ratio upon charging and discharging is used as an electrode active material, the bond may be readily cleaved or cycle properties may be deteriorated due to insufficient flexibility of PVdF. Furthermore, PVdF absorbs a carbonate electrolyte and then swells, thus causing deterioration in power capacity in the course of cycles.

Another binder used for lithium secondary batteries as an aqueous binder is rubber-based latex such as styrene-butadiene rubber (SBR). SBR is environmentally friendly, reduces the amount of binder used and improves the capacity of secondary batteries and initial charge/discharge efficiency. However, in this case, adhesion persistency is improved due to elasticity of the rubber, but adhesion strength is not greatly increased. Accordingly, SBR exhibits great volume expansion when charged/discharged and thus entails restriction in use such as inapplicability to active materials with high capacity which require electrodes with high adhesion strength.

Accordingly, there is an increasing need for development of binders which improve cycle properties of batteries and structural stability of electrodes and exhibit superior adhesion strength.

DISCLOSURE OF INVENTION

Technical Problem

Therefore, the present invention has been made to solve the above and other technical problems that have yet to be resolved.

As a result of a variety of extensive and intensive studies and experiments to solve the problems as described above, the inventors of the present invention have developed a binder for secondary battery electrodes wherein the content of a gel comprising a polymer particle obtained by copolymerizing three or more types of monomers is 50 to 100% by weight, as mentioned below, and a swelling index of the binder to an electrolyte is 1.1 to 5.0 and then confirmed that use of this binder contributes to improvement in cycle properties of batteries and adhesion strength. The present invention was completed based on this discovery.

Technical Solution

Accordingly, the binder for secondary battery electrodes according to the present invention a binder for secondary battery electrodes wherein the content of a gel comprising a polymer particle obtained by copolymerizing three or more types of monomers is 50 to 100% by weight and a swelling index of the binder to an electrolyte is 1.1 to 5.0.

The gel content means a binder cross-linking level and may be represented by a ratio of insoluble material in an electrolyte. The binder was dried at 80° C. for 24 hours or longer, 0.1 g of the binder was weighed ($M_a$), and the resulting binder was immersed in 5 g of an electrolyte (EC:PC:DEC=3:2:5, weight ratio) for 24 hours or longer. The binder immersed in the electrolyte was filtered on a 200 mesh of known weight and stood at room temperature for about 30 minutes to evaporate electrolyte present on the surface of the binder, and the weight ($M_b$) of binder was measured. Then, the resulting binder was dried at 80° C. for 24 hours or longer, the weight ($M_c$) of the binder left on the mesh was measured and gel content was calculated from the following equation.

$$\text{Gel content (\%)} = M_c/M_a * 100$$

The swelling index to the electrolyte means a ratio of a weight of binder before immersion in an electrolyte to a weight of binder after immersion in an electrolyte, which may be represented by $M_b/M_a$ ($M_a$: weight of binder before immersion in an electrolyte, and $M_b$: weight of a binder after immersion in an electrolyte).

In a preferred embodiment, the three or more types of monomers may be (a) an ethylenically unsaturated carbonic acid ester monomer, (b) at least one monomer selected from the group consisting of a vinyl monomer and a nitrile monomer, and (c) an ethylenically unsaturated carbonic acid monomer. Superior adhesion and improved adhesion maintenance can be obtained by such a suitable combination.

In this configuration, it is preferable that a mixture of (a) the ethylenically unsaturated carbonic acid ester monomer and (b) the at least one monomer selected from the group consisting of a vinyl monomer and a nitrile monomer may be present in an amount of 80 to 99% by weight, based on the total weight of the binder, and (c) the ethylenically unsaturated carbonic acid monomer may be present in an amount of 1 to 20% by weight, based on the total weight of the binder.

More preferably, the mixture of (a) the ethylenically unsaturated carbonic acid ester monomer and (b) the at least one monomer selected from the group consisting of a vinyl monomer and a nitrile monomer may be present in an amount of 90 to 95% by weight, based on the total weight of the binder, and (c) the ethylenically unsaturated carbonic acid monomer may be present in an amount of 5 to 10% by weight, based on the total weight of the binder.

In this configuration, (a) the ethylenically unsaturated carbonic acid ester monomer and (b) at least one monomer selected from a vinyl monomer and a nitrile monomer may be preferably added in a molar ratio of 1:10 to 10:1, more preferably, in a molar ratio of 5:5 to 9:1.

The content range may be suitably varied, depending on the properties of respective monomers and desired physical properties of binder.

For example, the ethylenically unsaturated carbonic acid ester monomer may be at least one monomer selected from the group consisting of methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethyl hexyl acrylate, hydroxy propyl acrylate, lauryl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, 2-ethyl hexyl methacrylate, hydroxy propyl methacrylate, lauryl methacrylate, methyl crotonate, ethyl crotonate, propyl crotonate, butyl crotonate, isobutyl crotonate, n-amyl crotonate, isoamyl crotonate, n-hexyl crotonate, 2-ethyl hexyl crotonate, hydroxy propyl crotonate, dimethylaminoethyl methacrylate and diethylaminoethyl methacrylate.

For example, the vinyl monomer may be at least one selected from the group consisting of styrene, o-, m- and p-methylstyrene, α-methylstyrene, β-methylstyrene, 2,4-dimethylstyrene, o-, m- and p-ethylstyrene, p-t-butylstyrene, divinyl benzene, vinyl naphthalene and mixtures thereof.

Examples of the nitrile monomer include succinonitrile, sebaconitrile, fluoronitrile, chloronitrile, acrylonitrile, methacrylonitrile and the like. More preferably, the nitrile monomer is at least one selected from the group consisting of acrylonitrile, methacrylonitrile and mixtures thereof.

For example, the ethylenically unsaturated carbonic acid monomer is at least one selected from the group consisting of unsaturated monocarbonic acid monomers such as acrylic acid, methacrylic acid, crotonic acid and isocrotonic acid and unsaturated dicarbonic acid monomers such as maleic acid, fumaric acid, citraconic acid, mesaconic acid, glutaconic acid and itaconic acid and acid anhydrides thereof. Of these, monoethylenically unsaturated monocarbonic acid such as acrylic acid and methacrylic acid is preferred.

As the gel content increases, the binder exhibits an increase in chemical resistance and thus improvement in cycle properties and lifespan properties. Accordingly, the gel content is more preferably 80 to 100%.

In a preferred embodiment, the binder according to the present invention may further comprise a cross-linking agent, in addition to the three or more kinds of monomers, to control the gel content. Such an additional cross-linking agent is preferably added in an amount of 0.1 to 10% by weight, more preferably, 0.5 to 5% by weight, based on the total weight of the copolymer. When the cross-linking agent is added in an excessively small amount, it cannot control volume variation of the electrode upon charge/discharge and exhibits low cycle capacity maintenance, and on the other hand, when the cross-linking agent is added in an excessively great amount, it cannot provide high adhesion force.

Any cross-linking agent may be used so long as it can function as a cross-linking agent and non-limiting examples thereof include multifunctional (meth)acrylate monomers. Specific examples of cross-linking agent include difunctional monomers such as 1,4-butanediol di(meth)acrylate, 1,6-hexanediol di(meth)acrylate, neopentyl glycol di(meth)acrylate, polyethylene glycol di(meth)acrylate, dicyclopentanyl di(meth)acrylate, caprolactone-modified dicyclopentenyl di(meth)acrylate, ethylene oxide-modified phosphoric acid di(meth)acrylate, di(acryloxyethyl)isocyanurate, allylated cyclohexyl di(meth)acrylate, dimethylol dicyclopentane diacrylate, ethylene oxide-modified hexahydrophthalic acid diacrylate, tricyclodecane dimethanol acrylate, neopentyl glycol-modified trimethylolpropane diacrylate and adamantane diacrylate; trifunctional monomers such as trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylol propanetri(meth)acrylate and tris (acryloxyethyl)isocyanurate; tetrafunctional monomers such as diglycerin tetra(meth)acrylate and pentaerythritol tetra (meth)acrylate; pentafunctional monomers such as propionic acid-modified dipentaerythritol penta(meth)acrylate; and hexafunctional monomers such as caprolactone-modified dipentaerythritol hexa(meth)acrylate. These monomers may be used alone or in a combination of two or more thereof.

The binder according to the present invention may be prepared by emulsion-polymerizing the monomers and a cross-linking agent, if necessary. The polymerization temperature and polymerization period may be suitably determined depending on the polymerization method or the type of polymerization initiator used. For example, the polymerization temperature may be about 50° C. to 200° C. and the polymerization period may be about 1 to 20 hours.

Examples of the emulsifying agent used for emulsion polymerization include oleic acid, stearic acid, lauric acid, fatty acid salts such as sodium or potassium salts of mixed fatty acids and general anionic emulsifying agents such as rosin acid. Preferably, a reactive emulsifying agent to improve stability of latex may be added. The emulsifying agent may be used alone or in combination of two or more thereof.

In addition, the polymerization initiator for emulsion polymerization may be an inorganic or organic peroxide and examples thereof include water-soluble initiators including potassium persulfate, sodium persulfate and ammonium persulfate, and oil-soluble initiators including cumene hydroperoxide and benzoyl peroxide. In addition, an activating agent to promote initiation reaction of peroxide may be further included with the polymerization initiators. For example, the activating agent may be at least one selected from the group consisting of sodium formaldehyde sulfoxylate, sodium ethylenediaminetetraacetate, ferrous sulfate, dextrose and combinations thereof.

The present invention also provides slurry for electrodes comprising a binder for electrodes and an electrode active material capable of occluding and releasing lithium.

The slurry comprises a predetermined solvent such as water or NMP, and an electrode can be fabricated by applying the slurry to the collector, followed by drying and rolling. The electrode active material will be described in more detail.

Accordingly, the present invention provides an electrode for secondary batteries in which the slurry is applied to a current collector. The electrode for secondary batteries may be a cathode or an anode.

For example, the cathode is fabricated by applying a mixture of a cathode active material, a conductive material and a binder to a cathode current collector, followed by drying. The anode is fabricated by applying a mixture of an anode active material, a conductive material and a binder on an anode current collector, followed by drying.

The electrode active material is a material causing electrochemical reaction in the electrode and is divided into a cathode active material and an anode active material depending on the type of electrode.

The cathode active material is a lithium transition metal oxide comprising two or more transition metals and examples thereof include, but are not limited to, layered compounds such as lithium cobalt oxide ($LiCoO_2$) or lithium nickel oxide ($LiNiO_2$) substituted with one or more transition metals; lithium manganese oxide substituted with one or more transition metals; lithium nickel oxide represented by the formula of $LiNi_{1-y}M_yO_2$ (in which M=Co, Mn, Al, Cu, Fe, Mg, B, Cr, Zn or Ga and includes one or more elements among the elements, $0.01 \leq y \leq 0.7$); lithium nickel cobalt manganese composite oxides represented by $Li_{1+z}Ni_b Mn_c Co_{1-(b+c+d)}M_d O_{(2-e)}A_e$ such as $Li_{1+z}Ni_{1/3}Co_{1/3}Mn_{1/3}O_2$ or $Li_{1+z}Ni_{0.4}Mn_{0.4}Co_{0.2}O_2$ (in which $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si or Y, A=F, P or Cl); and olivine lithium metal phosphate represented by the formula of $Li_{1+x}M_{1-y}M'_y PO_{4-z}X_z$ (in which M=transition metal, preferably Fe, Mn, Co or Ni, M'=Al, Mg or Ti, X=F, S or N, $-0.5 \leq x \leq +0.5$, $0 \leq y \leq 0.5$, and $0 \leq z \leq 0.1$).

Examples of the anode active material include carbon and graphite materials such as natural graphite, artificial graphite, expanded graphite, carbon fiber, hard carbon, carbon black, carbon nanotubes, perylene, activated carbon; metals alloyable with lithium, such as Al, Si, Sn, Ag, Bi, Mg, Zn, In, Ge, Pb, Pd, Pt and Ti and compounds containing these elements; composites of carbon and graphite materials with a metal and a compound thereof; and lithium-containing nitrides. Of these, a carbon-based active material, a silicon-based active material, a tin-based active material, or a silicon-carbon-based active material are more preferred. The material may be used alone or in combination of two or more thereof.

The conductive material serves to further improve the electrode active material and is commonly added in an amount of 0.01 to 30% by weight, based on the total weight of the electrode mix. Any conductive material may be used without particular limitation so long as it has suitable conductivity without causing adverse chemical changes in the fabricated secondary battery. Examples of conductive materials that can be used in the present invention include conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives. The current collector in the electrode is a material causing electrochemical reaction and is divided into a cathode current collector and an anode current collector depending on the type of electrode.

The cathode current collector is generally fabricated to have a thickness of 3 to 500 μm. There is no particular limit to the cathode current collector, so long as it has suitable conductivity without causing adverse chemical changes in the fabricated battery. As examples of the cathode current collector, mention may be made of stainless steel, aluminum, nickel, titanium, sintered carbon, and aluminum or stainless steel surface-treated with carbon, nickel, titanium, silver or the like.

The anode current collector is generally fabricated to have a thickness of 3 to 500 μm. There is no particular limit to the anode current collector, so long as it has suitable conductivity without causing adverse chemical changes in the fabricated battery. As examples of the anode current collector, mention may be made of copper, stainless steel, aluminum, nickel, titanium, sintered carbon, and copper or stainless steel surface-treated with carbon, nickel, titanium or silver, and aluminum-cadmium alloys.

These current collectors include fine irregularities on the surface thereof so as to enhance adhesion to electrode active materials. In addition, the current collectors may be used in various forms including films, sheets, foils, nets, porous structures, foams and non-woven fabrics.

The mixture (electrode mix) of an electrode active material, a conductive material and a binder may further comprise at least one selected from the group consisting of a viscosity controller and a filler.

The viscosity controller controls the viscosity of electrode mix so as to facilitate mixing of the electrode mix and application thereof to the collector and may be added in an amount of 30% by weight, based on the total weight of the electrode mix. Examples of the viscosity controller include, but are not limited to, carboxymethyl-cellulose and polyvinylidene fluoride. If necessary, the mentioned solvent may also serve as a viscosity controller.

The filler is an adjuvant component to inhibit expansion of the electrode. There is no particular limit to the filler, so long as it does not cause adverse chemical changes in the fabricated battery and is a fibrous material. As examples of the filler, there may be used olefin polymers such as polyethylene and polypropylene; and fibrous materials such as glass fibers and carbon fibers.

The present invention also provides a lithium secondary battery comprising the electrode for secondary batteries.

The lithium secondary battery generally further comprises a separator and a lithium salt-containing non-aqueous electrolyte, in addition to the electrodes.

The separator is interposed between the cathode and the anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of a non-aqueous electrolyte and a lithium salt.

As the non-aqueous electrolytic solution that can be used in the present invention, for example, mention may be made of non-protic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

The lithium salt is a material that is readily soluble in the above-mentioned non-aqueous electrolyte and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imides.

An organic solid electrolyte or an inorganic solid electrolyte may be used, if necessary.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte utilized in the present invention, mention may be made of nitrides, halides and sulfates of lithium such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH and $Li_3PO_4$—$Li_2S$—$SiS_2$.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas, fluoro-ethylene carbonate (FEC), propene sultone (PRS) or fluoro-ethlene carbonate (FEC).

The secondary battery according to the present invention may be used as a power source of a variety of devices, in particular, as a power source of electric vehicles (EV), hybrid electric vehicles (HEV) and the like which require long cycle properties, high rate properties and the like.

MODE FOR THE INVENTION

Now, the present invention will be described in more detail with reference to the following Examples. These examples are provided only to illustrate the present invention and should not be construed as limiting the scope and spirit of the present invention.

Example 1

Butyl acrylate (60 g), styrene (30 g) and acrylic acid (10 g) as monomers and allyl-methacrylate (0.5 g) as a cross-linking agent were added to water containing sodium lauryl sulfate as an emulsifying agent and potassium persulfate as a polymerization initiator, and these ingredients were mixed and polymerized at 70° C. for about 5 hours. A binder for secondary battery electrodes containing polymer particles obtained by polymerizing the monomers and the cross-linking agent was prepared through polymerization.

Example 2

A binder for secondary battery electrodes was prepared in the same manner as in Example 1 except that 2-ethylhexyl acrylate was used as the monomer, instead of butyl acrylate.

Example 3

A binder for secondary battery electrodes was prepared in the same manner as in Example 1 except that acrylonitrile was used as the monomer, instead of styrene.

Example 4

A binder for secondary battery electrodes was prepared in the same manner as in Example 1 except that itaconic acid was used as the monomer, instead of acrylic acid.

Example 5

A binder for secondary battery electrodes was prepared in the same manner as in Example 1 except that polyethylene glycol diacrylate was used as the cross-linking agent.

Comparative Example 1

A binder for secondary battery electrodes was prepared in the same manner as in Example 1 except that ethyl acrylate was used as the monomer, instead of styrene.

Comparative Example 2

A binder for secondary battery electrodes was prepared in the same manner as in Example 1 except that acrylonitrile was used as the monomer, instead of butyl acrylate.

Comparative Example 3

A binder for secondary battery electrodes was prepared in the same manner as in Example 1 except that 5 g of acrylic acid was used as the monomer.

Comparative Example 4

A binder for secondary battery electrodes was prepared in the same manner as in Example 1 except that allyl methacrylate was not used as the cross-linking agent.

Comparative Example 5

A binder for secondary battery electrodes was prepared in the same manner as in Example 1 except that 1 g of allyl methacrylate was used as the cross-linking agent.

Experimental Example 1

Measurements of Swelling Index and Gel Content

The swelling index of the polymer binder to the electrolyte was measured. The binders of Example 1 to 5 and the binders of Comparative Example 1 to 5 were dried at 80° C. for 24 hours or longer, the weight ($M_a$) of 0.1 g of the binder prior to immersion in an electrolyte was measured, and the resulting binder was immersed in 5 g of an electrolyte (EC:PC:DEC=3:2:5, weight ratio) for 24 hours or longer. The binder immersed in the electrolyte was filtered on a 200 mesh whose weight is known and was stood at ambient temperature for about 30 minutes to evaporate the electrolyte present on the surface of binder, and the weight ($M_b$) of the remaining binder was measured. A swelling index was calculated in the following equation.

Swelling index=$(M_b/M_a)$

The gel content means a binder cross-linking level and may be represented by a ratio of insoluble material in an electrolyte. The binders of Example 1 to 5 and the binders of Comparative Example 1 to 5 were dried at 80° C. for 24 hours or longer, 0.1 g of the binder was weighed ($M_a$), and the resulting binder was immersed in 5 g of an electrolyte (EC:PC:DEC=3:2:5, weight ratio) for 24 hours or longer. The binder immersed in the electrolyte was filtered on a 200 mesh whose weight is known, dried at 80° C. for 24 hours or longer, and the weight ($M_c$) of binder left on the mesh was measured.

Gel content (%)=$M_c/M_a*100$

The results thus calculated are summarized in Table 1.

Experimental Example 2

Adhesion Strength Test

In the case where the polymer binder according to the present invention was used as an anode binder for lithium secondary batteries, adhesion strength between the electrode active material and the current collector was measured.

The binders of Examples 1 to 5 and the binders of Comparative Examples 1 to 5 were added such that a ratio of a cathode active material, a conductive material, a viscosity controller and a binder is 96:1:1:2, to prepare slurry, and the slurry was coated on a Cu foil to fabricate an electrode.

The surface of the electrode thus fabricated was cut and fixed on a slide glass and 180 degree peel strength was measured, while the current collector was peeled off. The results thus obtained are shown in Table 1. Evaluation was based on an average of five or more reel strengths.

TABLE 1

|  | Swelling index | Gel content (%) | Adhesion strength (gf/cm) |
| --- | --- | --- | --- |
| Ex. 1 | 1.5 | 99 | 32 |
| Ex. 2 | 1.3 | 99 | 35 |
| Ex. 3 | 1.5 | 98 | 30 |
| Ex. 4 | 1.8 | 97 | 29 |
| Ex. 5 | 1.9 | 98 | 33 |
| Comp. Ex. 1 | 4.8 | 92 | 25 |
| Comp. Ex. 2 | 1.1 | 99 | 5 |
| Comp. Ex. 3 | 2.7 | 91 | 20 |
| Comp. Ex. 4 | 3.6 | 82 | 33 |
| Comp. Ex. 5 | 1.2 | 100 | 11 |

As can be seen from Table 1 above, electrodes employing the binders of Examples 1 to 5 according to the present invention exhibited considerably high adhesion strength, as compared to electrodes employing the binders of Comparative Examples 1 to 5. It is believed that the high adhesion strength can be exerted by controlling the kind and content of the monomers and cross-linking agents. On the other hand, the binder of Comparative Example 2 exhibited low adhesion strength, since the kind and amount of the monomers providing adhesion strength are unsuitable. This causes foreign materials and separation between the electrode and the foil in the process of cell fabrication. Further, the binder of Comparative Example 4 exhibited a considerably high adhesion strength, but exhibited a low gel content. For this reason, the binder was dissolved in an electrolyte, resulting in a deterioration of adhesion strength between the electrode and the foil. As can be seen from Experimental Example 3, the binder of Comparative Example 4 is unsuitable for use in a binder due to deteriorated cycle properties of secondary batteries.

Experimental Example 3

Cycle Property Test

A coin-shaped battery (coin-half cell) was fabricated using the electrode fabricated in Experimental Example 1 as a cathode, a Li metal as an anode, and an electrolyte containing 1M LiPF$_6$ in a mixed solvent of EC:DMC:DEC=1:2:1.

Variation in charge/discharge property of respective coin batteries thus fabricated was tested using a charge/discharge measuring apparatus. The first cycle discharge capacity and efficiency of the batteries were measured at 0.2 C charge and 0.2 C discharge, 50 charge/discharge cycles were conducted at 1 C charge and 1 C discharge, and maintenance (%) of 50th cycle capacity to the 1$^{st}$ (initial) capacity was measured. The results thus obtained are shown in Table 2 below.

TABLE 2

|  | 1$^{st}$ cycle discharge capacity (mAh/g) | 1$^{st}$ cycle efficiency (%) | 50$^{th}$ cycle maintenance (%) |
| --- | --- | --- | --- |
| Ex. 1 | 264 | 97 | 95 |
| Ex. 2 | 261 | 96 | 96 |
| Ex. 3 | 269 | 99 | 94 |
| Ex. 4 | 270 | 99 | 93 |
| Ex. 5 | 259 | 95 | 93 |
| Comp. Ex. 1 | 232 | 84 | 72 |
| Comp. Ex. 2 | 192 | 53 | 32 |
| Comp. Ex. 3 | 267 | 98 | 82 |
| Comp. Ex. 4 | 266 | 98 | 67 |
| Comp. Ex. 5 | 252 | 93 | 75 |

As can be seen from Table 2, the batteries of Examples 1 to 5 using the binder according to the present invention exhibited at least 90% capacity maintenance, as compared to the initial capacity, even after 50 cycles. This is due to the fact that swelling of the binder to the electrolyte secures a movement passage, to allow Li$^+$ ions which move upon charge/discharge to reach the active material and, at the same time, maintains adhesion strength between the active material and the foil, and the high gel content reduces electrochemical side-reaction with the electrolyte.

On the other hand, as can be seen in the batteries of Comparative Examples 1 to 5, the binder used cannot inhibit movement of Li$^+$ ions, as mentioned above, or cannot maintain adhesion strength between the active material and the foil, thus resulting in a considerable capacity decrease. Meanwhile, it can be seen that the battery of Comparative Example 4 exhibited a deteriorated cycle capacity maintenance. Since the binder did not comprise a cross-linking agent, it dissolved in the electrolyte in the electrode and thus acted as an impurity inhibiting movement of Li$^+$ ions, resulting in a decrease in cycle capacity maintenance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the fore-going, the binder for secondary battery electrodes according to the present invention has a predetermined value of content of a gel comprising a polymer particle obtained by copolymerizing three or more types of monomers and of a swelling index of the binder to an electrolyte, thus providing improved cycle properties and high adhesion strength.

The invention claimed is:

1. A binder for secondary battery electrodes, comprising: a gel comprising a polymer particle obtained by copolymerizing three or more types of monomers, the binder having a gel content ranging from 97 to 99% by weight and a swelling index in the presence of an electrolyte ranging from 1.3 to 1.9, wherein the electrolyte comprises ethylene carbonate, propylene carbonate and diethyl carbonate, wherein a mass ratio of diethyl carbonate to ethylene carbonate and propylene carbonate is 1:1 and wherein the three or more types of monomers are an ethylenically unsaturated carbonic acid ester monomer, at least one monomer selected from the group consisting of a vinyl monomer and a nitrile monomer, and an ethylenically unsaturated carbonic acid monomer, wherein the ethylenically unsaturated carbonic acid ester monomer and the at least one monomer selected from the group consisting of a vinyl monomer and a nitrile monomer are present in an amount of 80 to 99% by weight, based on the total weight of the binder, and the ethylenically unsaturated carbonic acid monomer is present in an amount of greater than 5% to 20% by weight, based on the total weight of the binder, wherein the cross-linking agent is present in an amount of 0.1 to less than 1% by weight, based on the total weight of the copolymer, and wherein the cross-linking agent is at least one monomer selected from the group consisting of difunctional monomers, trifunctional monomers, tetrafunctional monomers, pentafunctional monomers, and hexafunctional monomers.

2. The binder according to claim 1, wherein the ethylenically unsaturated carbonic acid ester monomer and the at least one monomer selected from a vinyl monomer and a nitrile monomer are added in a molar ratio of 1:10 to 10:1.

3. The binder according to claim 1, wherein the ethylenically unsaturated carbonic acid ester monomer is at least one monomer selected from the group consisting of methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethyl hexyl acrylate, hydroxy propyl acrylate, lauryl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, 2-ethyl hexyl methacrylate, hydroxy propyl methacrylate, lauryl methacrylate, methyl crotonate, ethyl crotonate, propyl crotonate, butyl crotonate, isobutyl crotonate, n-amyl crotonate, isoamyl crotonate, n-hexyl crotonate, 2-ethyl hexyl crotonate, hydroxy propyl crotonate, dimethylaminoethyl methacrylate and diethylaminoethyl methacrylate.

4. The binder according to claim 1, wherein the vinyl monomer is at least one monomer selected from the group consisting of styrene, o-, m- and p-methylstyrene, α-methylstyrene, β-methylstyrene, 2,4-dimethylstyrene, o-, m- and p-ethylstyrene, p-t-butylstyrene, divinyl benzene and vinyl naphthalene.

5. The binder according to claim 1, wherein the nitrile monomer is at least one monomer selected from the group consisting of succinonitrile, sebaconitrile, fluoronitrile, chloronitrile, acrylonitrile and methacrylonitrile.

6. The binder according to claim 1, wherein the ethylenically unsaturated carbonic acid monomer is at least one selected from the group consisting of unsaturated monocarbonic acid monomers, unsaturated dicarbonic acid monomers, and acid anhydrides thereof.

7. The binder according to claim 6, wherein the unsaturated monocarbonic acid monomers are selected from the group consisting of acrylic acid, methacrylic acid, crotonic acid and isocrotonic acid, and wherein the unsaturated dicarbonic acid monomers are selected from the group consisting of maleic acid, fumaric acid, citraconic acid, mesaconic acid, glutaconic acid, and itaconic acid.

8. An electrode for secondary batteries in which an electrode active material is bonded to a conductive material by the binder for secondary batteries according to claim 1.

9. The electrode according to claim 8, wherein the electrode active material is a lithium transition metal oxide powder or carbon powder.

10. A lithium secondary battery comprising the electrode for secondary batteries according to claim 8.

11. The binder according to claim 1, wherein the difunctional monomers are selected from the group consisting of 1,4-butanediol di(meth)acrylate, 1,6-hexanediol di(meth)acrylate, neopentyl glycol di(meth)acrylate, polyethylene glycol di(meth)acrylate, dicyclopentanyl di(meth)acrylate, caprolactone-modified dicyclopentenyl di(meth)acrylate, ethylene oxide-modified phosphoric acid di(meth)acrylate, di(acryloxyethyl)isocyanurate, allylated cyclohexyl di(meth)acrylate, dimethylol dicyclopentane diacrylate, ethylene oxide-modified hexahydrophthalic acid diacrylate, tricyclodecane dimethanol acrylate, neopentyl glycol-modified trimethylolpropane diacrylate, and adamantane diacrylate,
wherein the trifunctional monomers are selected from the group consisting of trimethylol propanetri(meth)acrylate, dipentaerythritol tri(meth)acrylate, propionic acid-modified dipentaerythritol tri(meth)acrylate, pentaerythritol tri(meth)acrylate, propylene oxide-modified trimethylol propanetri(meth)acrylate, and tris (acryloxyethyl)isocyanurate,
wherein the tetrafunctional monomers are selected from the group consisting of diglycerin tetra(meth)acrylate and pentaerythritol tetra(meth)acrylate,
wherein the pentafunctional monomers are selected from the group consisting of propionic acid-modified dipentaerythritol and penta(meth)acrylate, and
wherein the hexafunctional monomers are selected from the group consisting of caprolactone-modified dipentaerythritol and hexa(meth)acrylate.

* * * * *